US011331555B2

(12) United States Patent
Roelle et al.

(10) Patent No.: US 11,331,555 B2
(45) Date of Patent: *May 17, 2022

(54) SYSTEM AND METHOD FOR PROVIDING AN IMPROVED GOLF SWING

(71) Applicants: Michael E. Roelle, Elmhurst, IL (US); Francesca C. Roelle, Elmhurst, IL (US)

(72) Inventors: Michael E. Roelle, Elmhurst, IL (US); Francesca C. Roelle, Elmhurst, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/854,545

(22) Filed: Apr. 21, 2020

(65) Prior Publication Data

US 2020/0246672 A1 Aug. 6, 2020

Related U.S. Application Data

(63) Continuation of application No. 15/912,140, filed on Mar. 5, 2018, now Pat. No. 10,625,133, which is a
(Continued)

(51) Int. Cl.
| | |
|---|---|
| A63B 69/36 | (2006.01) |
| A63B 23/12 | (2006.01) |
| A63B 21/075 | (2006.01) |
| A63B 21/06 | (2006.01) |
| A63B 21/055 | (2006.01) |
| A63B 21/04 | (2006.01) |
| A63B 21/02 | (2006.01) |
| G09B 19/00 | (2006.01) |
| A63B 102/18 | (2015.01) |
| A63B 102/32 | (2015.01) |

(Continued)

(52) U.S. Cl.
CPC ............ *A63B 69/36* (2013.01); *A63B 21/023* (2013.01); *A63B 21/0442* (2013.01); *A63B 21/0552* (2013.01); *A63B 21/0601* (2013.01); *A63B 21/075* (2013.01); *A63B 23/1209* (2013.01); *A63B 69/36213* (2020.08); *G09B 19/0038* (2013.01); *A63B 2102/02* (2015.10); *A63B 2102/14* (2015.10); *A63B 2102/18* (2015.10); *A63B 2102/32* (2015.10); *A63B 2208/0204* (2013.01); *A63B 2225/093* (2013.01)

(58) Field of Classification Search
CPC ..... A63B 69/36; A63B 69/365; A63B 21/075; A63B 21/0552; A63B 21/0601; A63B 21/023; A63B 23/1209; A63B 21/0442; A63B 2102/18; A63B 2102/32; A63B 2225/093; A63B 2102/14; A63B 2102/02; A63B 2208/0204; G09B 19/0038

See application file for complete search history.

(56) References Cited

U.S. PATENT DOCUMENTS 7,806,780 B1 * 10/2010 Plunkett .......... A63B 69/36213
473/257
8,591,349 B1 * 11/2013 Jones ............... A63B 69/36211
473/229
(Continued)

*Primary Examiner* — Nini F Legesse
(74) *Attorney, Agent, or Firm* — Vitale, Vickrey, Niro & Gasey

(57) ABSTRACT

A system and method for improving a golf swing. The system includes a club lie angle calculator, a golf club grabber, and a propeller channel for creating and supporting a swing plane for a user equal to the lie angle of a given golf club.

9 Claims, 7 Drawing Sheets

Related U.S. Application Data continuation of application No. 15/344,964, filed on Nov. 7, 2016, now Pat. No. 9,908,024, and a continuation of application No. 14/683,322, filed on Apr. 10, 2015, now Pat. No. 9,486,688.

(51) Int. Cl.
*A63B 102/02* (2015.01)
*A63B 102/14* (2015.01)

(56) References Cited

U.S. PATENT DOCUMENTS

| | | | | |
|---|---|---|---|---|
| 9,486,688 B2* | 11/2016 | Roelle | ............. | A63B 21/0442 |
| 9,908,024 B2* | 3/2018 | Roelle | ............. | A63B 21/023 |
| 10,625,133 B2* | 4/2020 | Roelle | ............. | G09B 19/0038 |
| 2003/0114238 A1* | 6/2003 | Meneghini | ....... | A63B 69/36213 |
| | | | | 473/257 |
| 2008/0070712 A1* | 3/2008 | Jones | ............. | A63B 69/3621 |
| | | | | 473/257 |
| 2008/0153618 A1* | 6/2008 | Arther | ............. | A63B 69/3621 |
| | | | | 473/259 |

* cited by examiner

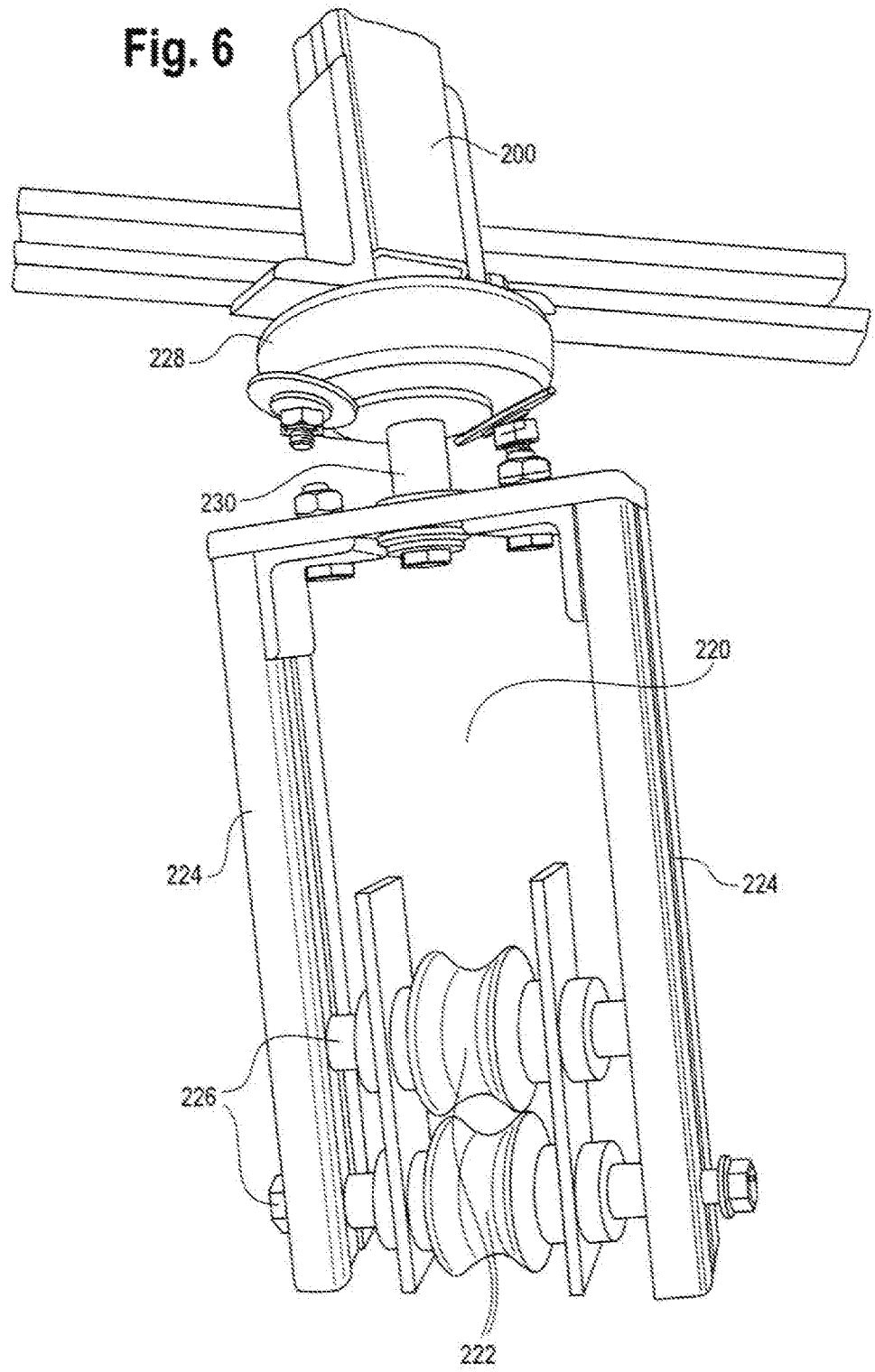

SYSTEM AND METHOD FOR PROVIDING AN IMPROVED GOLF SWING

This application is a continuation of application Ser. No. 15/912,140, now U.S. Pat. No. 10,625,113 issued on Apr. 21, 2020 which is a continuation of application Ser. No. 15/344, 964, filed Nov. 7, 2016, now U.S. Pat. No. 9,908,024 issued on Mar. 6, 2018 and application Ser. No. 14/683,322, filed Apr. 10, 2015, now U.S. Pat. No. 9,486,688 issued on Nov. 8, 2016.

FIELD OF DISCLOSURE

The present disclosure relates to a system and method for improving a person's golf swing. More specifically, the present disclosure discloses and teaches a system which requires urges a user to swing a given club such that the swing plane of that club is equal to the lie angle of that club.

BACKGROUND

One can argue that properly and accurately hitting a golf ball is the most difficult thing in all of sports to execute. Such a process is even more difficult than successfully hitting a pitch from a professional pitcher. One reason for such comparative difficulty is that a golf club has to travel 1.5 revolutions versus only 1 revolution for the baseball bat, hence more room for error.

A full swing of a golf club rotates a total of 1.5 revolutions in less than 2 seconds. The first 180 degrees is from address to over the head (the backswing). The next 180 degrees is from over the head back down to impacting the golf ball (the downswing). The final 180 degrees is from impact, toward the intended target, to over the head (the follow through). One must rotate a golf club a total of 540 degrees to fully strike the golf ball. Given the length of such a rotational arc, using an improper or unorthodox swing over such an arc will only make more room for error.

DESCRIPTION OF THE PRIOR ART

There have been hundreds if not thousands of swing training aids that try and teach the proper swing for golf. The lie angle of a given club is not a focus of such approaches. In fact, the term "club's lie angle" is the most misunderstood and/or overlooked aspects in the game of golf. For example, the term is commonly misunderstood with the clubface loft angle. The lie angle of a club is present when the clubface is square on the ground. It's the angle that is formed between the center of the club's shaft and the ground at address, extending away from the club face.

There exist a wide of array of lie angles for golf clubs. Every golf club in a given bag has a different lie angle, and because of this fact, golfers will swing each club differently. Typically, the putter has the greatest lie angle, followed by the wedge, 9 iron, 8 iron, 7 iron, 6 iron, 5 iron, 3 hybrid, 4 iron, 2 hybrid, 3 iron, 2 iron, 1 hybrid, 3 wood, 5 wood, and the driver. Furthermore, lie angles differ between golf club manufacturers. Some lie angles stay within some uniform standard, but the difference between the same clubs by two different manufactures can be several degrees. Additionally, golfers have a choice of neutral, flat, or up right lie angles when buying clubs off the shelf. More serious golfers can often also have those tweaked up or down a couple of degrees.

The club's designed lie angle is revealed at address, i.e., when the club is square on the ground. It is also revealed at impact. The club must travel on a swing plane 360 degrees, to go from address to impact (180 degrees backswing and 180 degrees downswing). Thus, there is a need for a device which can teach a golfer to use a consistent swing plane throughout the golf swing.

Definition of Terms

The following terms are used in the claims of the patent as filed and are intended to have their broadest plain and ordinary meaning consistent with the requirements of the law.

A "a golf club grabber" is a multiaxial mechanical subassembly which maintains contact with a given golf club throughout the arc of a swing while permitting extension, rotation, and/or hinging movement of the club during the swing. An example of such a golf club grabber would include, but is not limited to the combination of a hinge axle (for permitting hinging movement) in connection with a frame holding at least a pair of closed-biased rollers for receiving the club shaft, where the rollers permit extension or rotation of the club.

A "T-Channel Assembly" are two pieces of a square hollow channel that are attached in a way that resemble the letter "T." Preferably, it is composed of: a) a "Vertical T-Channel Piece" is the one square hollow piece of a "T-Channel Assembly" that goes up and down or is vertical; and b) a "Horizontal T-Channel Piece*" is the one square hollow piece of a "T-Channel Assembly" that goes right and left or is horizontal.

Propeller Arm Plates are two plates of approximately the same size that accept, secure, and also allow for adjustments of a channel piece.

A "Club Lie Angle Setter Plate" is a plate that is moveable and is used to reveal the club's lie angle when a golf club is attached to it.

A "Club Channel" is a T-slotted channel piece that the club may slide into, that is attached to the "Club Lie Angle Setter Plate", which is parallel to the sides of the "Club Lie Angle Setter", and is perpendicular to the top and bottom of the "Club Lie Angle Setter Plate"

A "Bottom Edge Extender Channel" is a T-slotted channel piece that freely moves up and down, that is attached to the "Club Lie Angle Setter Plate", which is parallel to the sides of the "Club Lie Angle Setter Plate", and is perpendicular to the top and bottom of the "Club Lie Angle Setter Plate." The purpose of bottom edge extender channel is to extend the bottom edge of the club lie angle setter plate.

A "Pillow Block Bearing" is a pedestal housing that is used to provide support for a rotating shaft with the help of a compatible bearing. The housing is bolted to a foundation through the holes in the base.

A "Vertical Adjusting Channel Bracket" is a T-slotted channel piece that is attached to the "Horizontal T-Channel Piece" in a vertical manner that accepts a movable right angle bracket. It's the right angle bracket which moves and holds the "Arm for the Dual Channel Propeller." The movable right angle bracket is able to be adjusted up and down by turning a knob.

A "Propeller Channel Assembly" is the rotating assembly of the present disclosure. The entire assembly is supported by a fastener that attaches to a support, such as the "Pillow Block Bearings."

A "Dual Channel Propeller" is a structure which includes channels. The "Dual Channel Propeller" includes structure which resembles the propeller of an airplane.

A "Back" or "First" Propeller Channel" is a square hollow channel piece which is the back channel of the "Dual Channel Propeller"

A "Front" or "Second" Propeller Channel is a square hollow channel piece which is the front channel of the "Dual Channel Propeller".

An "Arm for the Dual Channel Propeller" is a square hollow channel piece that supports the "Pillow Block Bearings" on one end, and the "Pillow Block Bearings" that accept a long bolt which is similar to that of an airplane propeller shaft. This long bolt goes through the midpoint of the "first propeller channel", hence connecting the "Dual Channel Propeller" to the arm at approximately a 90 degree angle. The "arm for the dual Channel Propeller" is attached to the "Horizontal T-Channel Piece" by the means of "Two Plates", allowing the "arm" to be adjusted so that the angle of the arm equals the club's lie angle and once that is achieved it is then secured. This adjusting of the arm is accomplished by turning the knob for the "vertical adjusting channel bracket" so that the movable right angle bracket which is freely connected to the "vertical adjusting channel bracket" moves and simultaneously moves the arm. This is made possible because the movable right angle bracket on the "vertical adjusting channel bracket is always engaged to the arm.

OBJECTS AND SUMMARY OF THE DISCLOSURE

The present disclosure teaches a system and method for improving the swing of a golfer by making the swing plane equal to the plane of that club's lie angle. Specifically, the present disclosure provides teachings that will take any golf club and set the swing plane for that club equal to the swing plane of that club's designed lie angle, directing the club's swing path to stay on that swing plane for the entire swing, while further allowing for a wide array of height adjustments for the center of rotation.

The system of the present disclosure typically comprises three main components: a) a club lie angle calculator for enabling the calculation of a specific club lie angle when the striking surface is substantially parallel to the ground; b) a golf club grabber for engaging at least the shaft of a specific golf club while a user is swinging the golf club; and c) a propeller channel for rotating the golf club grabber in an arc. The club lie angle calculator can comprise a plate that pivots clockwise and counter clockwise to equal the club's lie angle when a golf club is attached to it so as to measure the club lie angle to be used as the swing plane angle for the user using that club. The golf club grabber is a multiaxial mechanical structure which maintains contact with a given golf club throughout the arc of a swing while permitting extension, rotation, and/or hinging movement of the club during the swing. The propeller channel provides an arc that is angled relative to the ground so as to correspond to the specific club lie angle calculated by the club lie angle setter. The propeller channel can further include a subassembly which includes a propeller L for attaching the propeller channel to the golf club grabber. Further options include the use of resistance bands and or weight plates to adjust the swing rate and/or improve the muscle memory imparted to the user in the operation of the system.

Thus, it can be seen that one objection of the present disclosure is to provide a system and method for providing a golf swing aid which teaches a user to swing a golf club on a swing plane corresponding to the lie angle for that club.

Another object of the present disclosure is to provide a system and method for engaging the shaft of a golf club during the swing process while permitting the extension rotation and/or hinging movement of the club.

Still another object of the present disclosure is to provide a structure for rotating a golf club in an adjustable arc, wherein the arc is adjustable so as to correspond to the lie angle of the club.

Yet another object of the present disclosure is to provide a system and method for adjusting the rotational center of the swing plane depending upon the individual factors of the user, such as the user's height.

Still a further object of the present disclosure is to provide a system and structure for a swine plane arc that provides support for a rotating shaft and/or arm to guide a user during the swing process.

Another object of the present disclosure is to provide a swing mechanism that supports the development of muscle memory to improve the mechanics of a golf swing specific to a given club.

Still a further object of the present disclosure is to provide a golf swing teaching device including resistance tubing operatively engaging the propeller channel so as to provide resistance to at least a portion of the swing.

Yet a further object of the present disclosure is to provide a golf swing teaching device including weight plates operatively engaging the propeller channel so as to provide resistance to at least a portion of the swing.

Still a further object of the present disclosure is to provide an adjustable member, such as a propeller L, so as to provide an adjustable length connection between the propeller channel and a golf club grabber.

These and other goals and objects of the present disclosure will be seen with reference to the following brief description of the drawings and their corresponding disclosure.

BRIEF DESCRIPTION OF THE DRAWINGS

FIG. 6 show a front view of the club grabber subassembly in accordance with example embodiment of the present disclosure.

DETAILED DESCRIPTION OF THE PREFERRED EMBODIMENTS

Set forth below is a description of what currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1A:
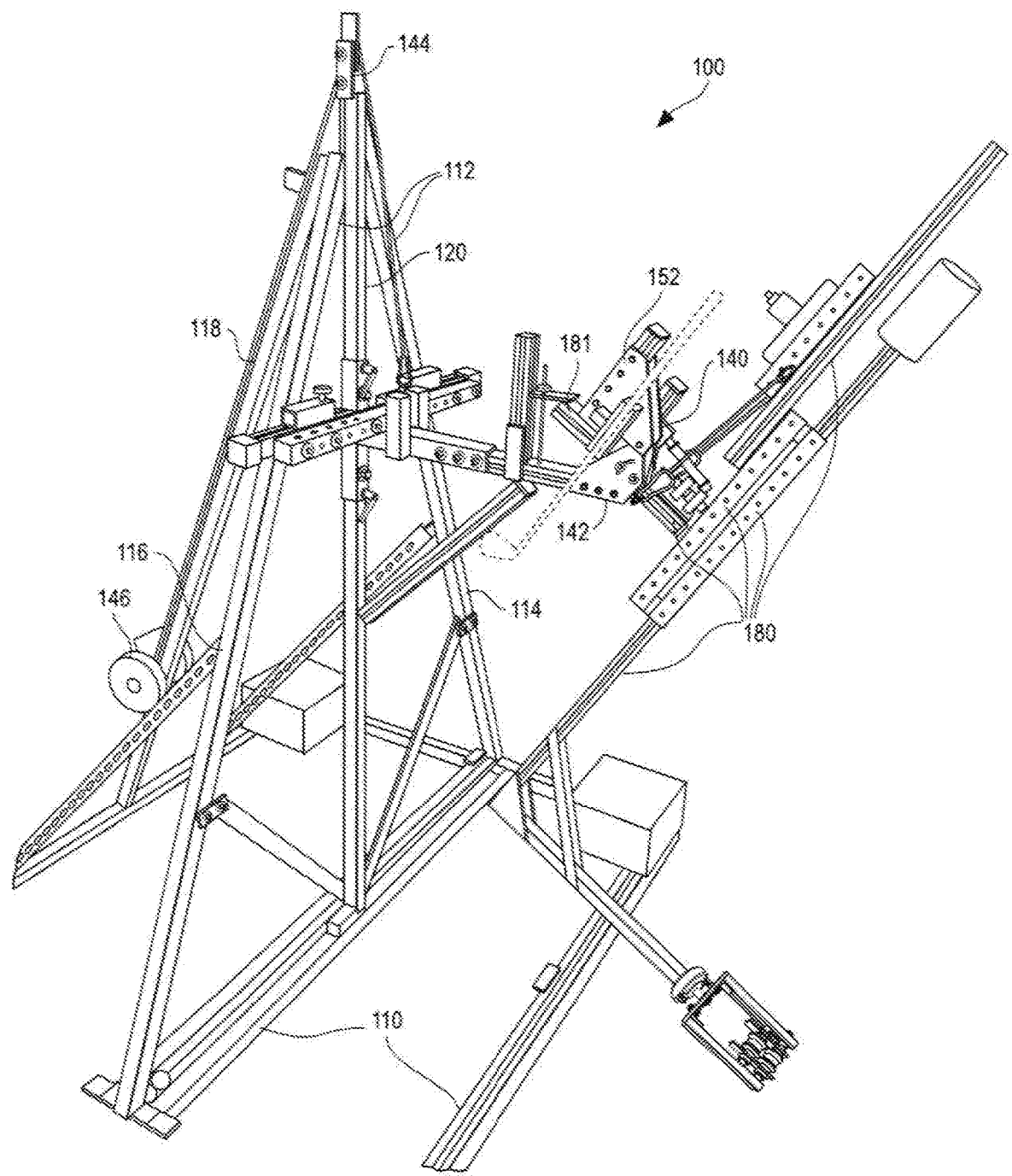
FIGS. 1a and 1b show a first perspective view and a close up of that perspective view of an assembly in accordance with one example embodiment of the present disclosure.
Figure 1B:
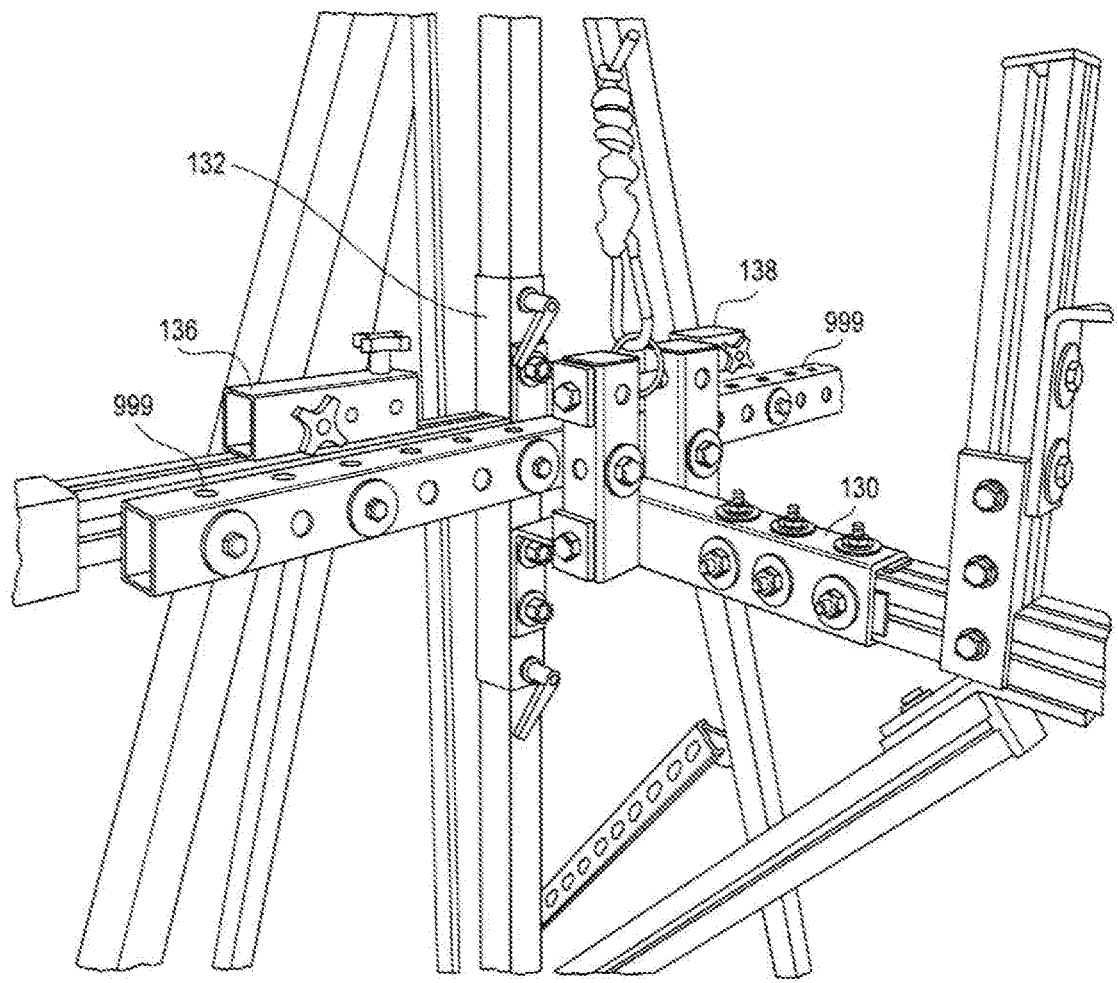

Referring first the FIGS. 1a and 1b, a first embodiment 100 of the present disclosure includes a base 110. In a first preferred embodiment, base 110 comprises six pieces of channel that are 5 feet long and define a 1⅝" square channel. The base 110 may be fastened together with "L" plates and fasteners (not shown). The base supports an "A" frame 112, which comprises right post 114, left post 116, back channel post 118, and center post 120, each of which are connected to the base 110.

The "A" frame supports the "T" channel subassembly (FIG. 1b) which includes a horizontal "T" channel 130, a vertical "T" channel 132, a T-channel support or brace 999, and brackets 136, 138. The vertical T channel 132 wraps around the center post 120 and slides up and down the center post 120 so as to be adjustable to set the center of rotation for the swing plane being established. Brackets 136, 138 and T-Channel support 999 supports the T-channel subassembly and prevents it from shilling left or right once the desired center of rotation is set and clamped in place. The T-Channel support 999 and brackets 136 & 138 are able to follow and engage the left post 116 and right post 114 down the length of the "A" frame. The one end of the horizontal T-channel 130 is connected perpendicularly to the vertical T-channel 132 by the means of two L brackets. The other end of the horizontal T-channel 130 includes two plates 140, 142 which sandwiches, while also allowing for adjustments, an arm for the dual channel propeller 181, which supports the entire propeller channel assembly 180, described in greater detail below. One of the two plates 140, 142 also independently supports the club lie angle setter plate 152, also described in greater detail below. This array of structures can be vertically displaced to adjust the center of rotation for the swing rotation plane through the use of a rope through a pulley 144 which connects the "T" channel subassembly to a trolley assembly 146 that sits in the back channel post 118. The trolley assembly 146 is equipped with weights and glides up and down in the back channel to pull up or down and/or support the T-Channel subassembly and the propeller channel assembly 180.

Figure 2:
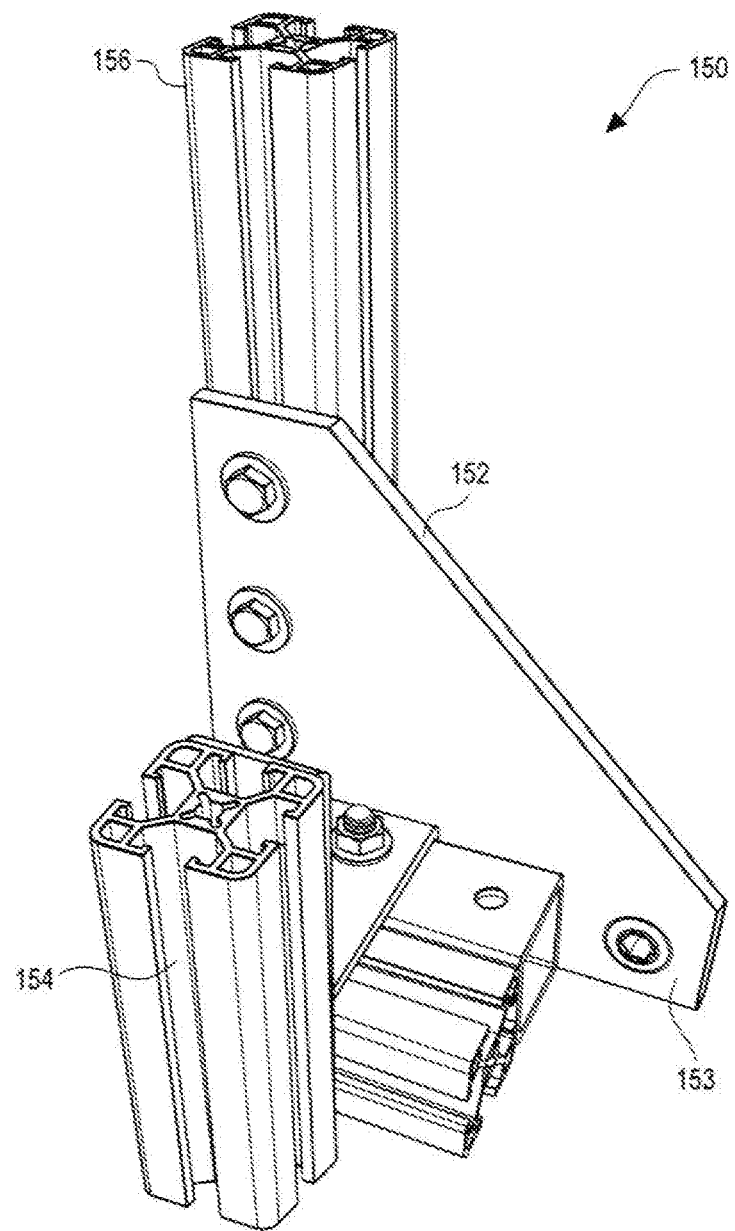
FIG. 2 shows a detail of the club lie angle setter plate in cooperation with the club channel in accordance with one example embodiment of the present disclosure.
Figure 3:
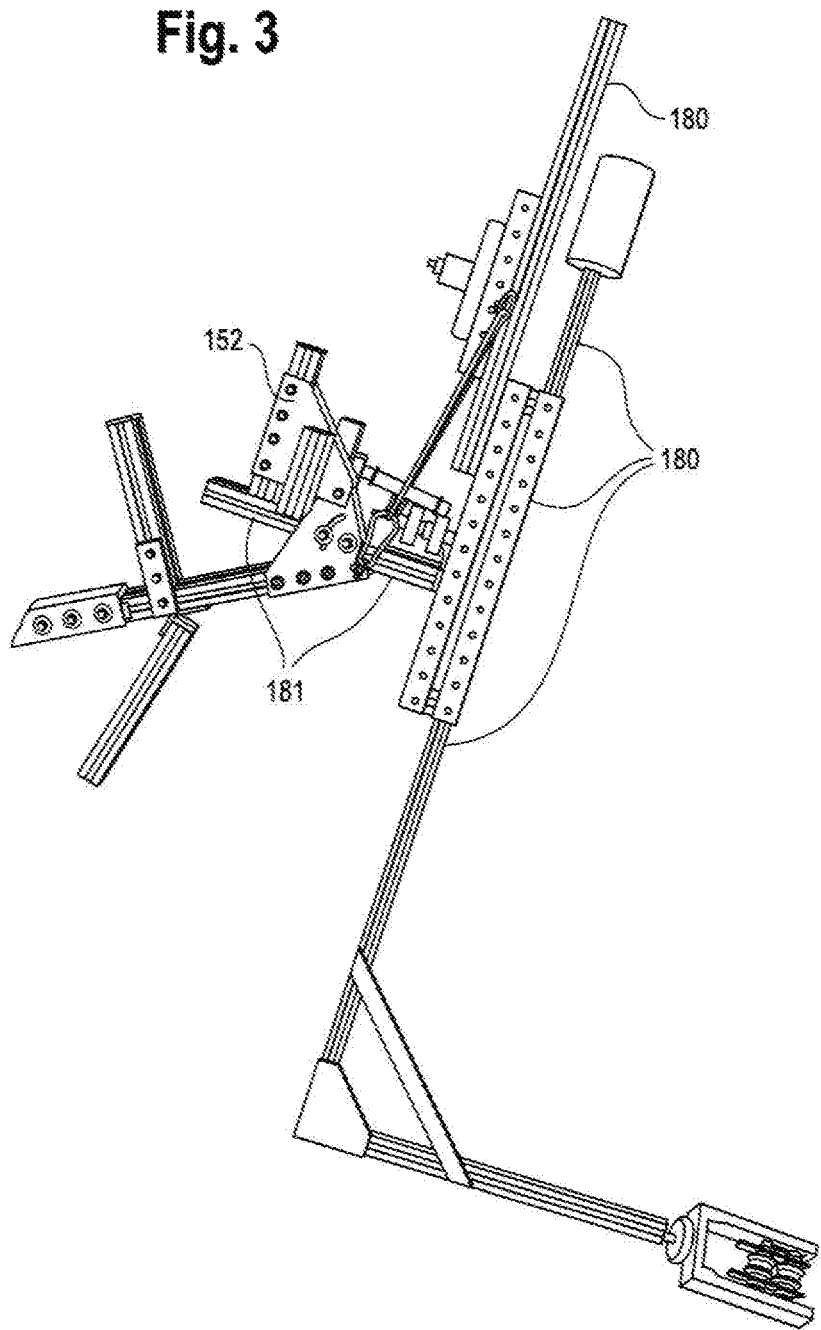
FIG. 3 shows a perspective view of the propeller arm and dual channel propeller subassembly in accordance with one example embodiment of the present disclosure.
Figure 4:
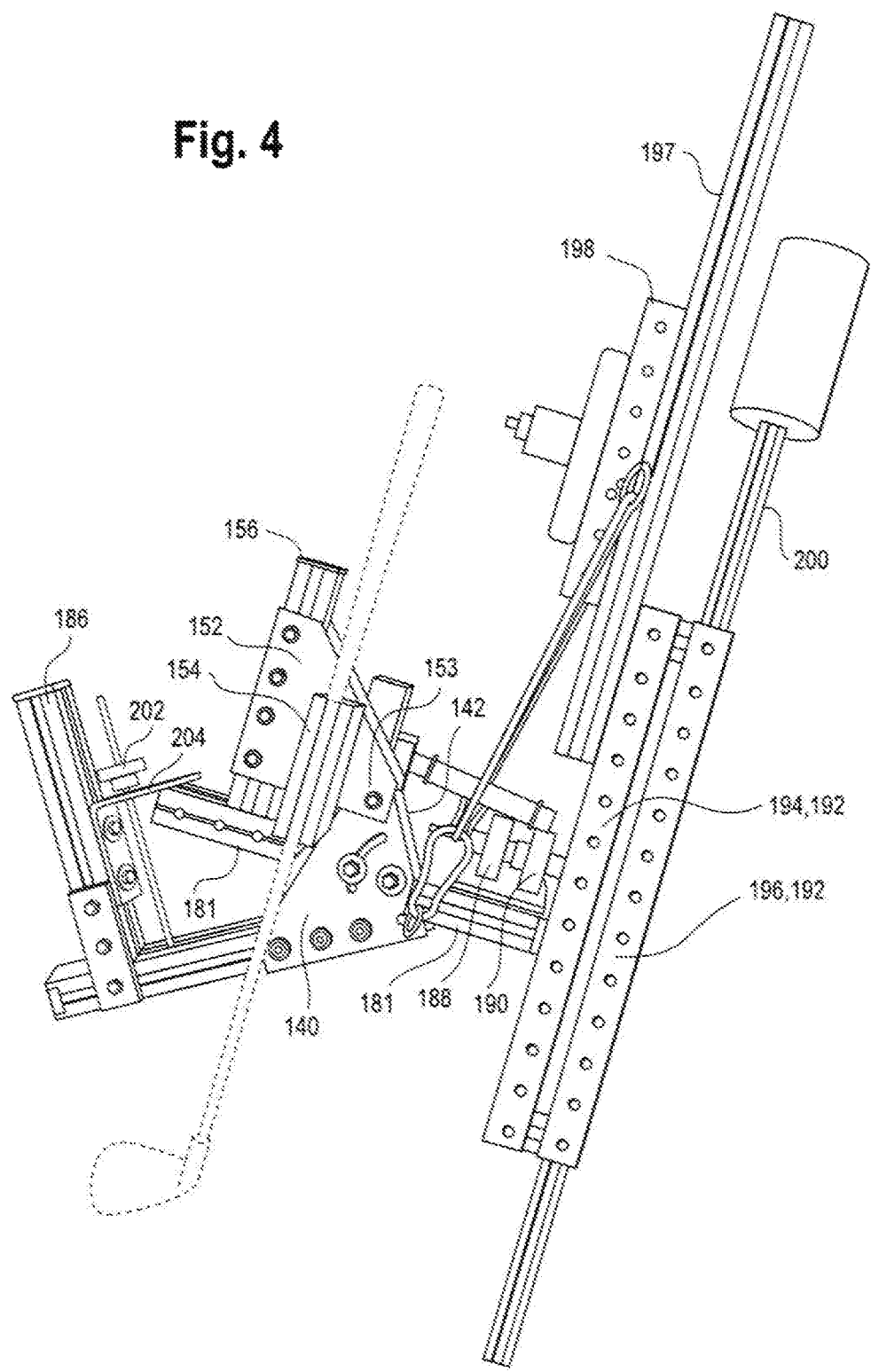
FIG. 4 shows the propeller arm and club lie angle setter subassembly with a club placed in the club channel.

As shown in FIGS. 2-4 the club lie angle setter subassembly 150, which comprises of the club lie angle setter plate 152, and attached to that is both, club channel 154, and bottom edge extender channel 156. The club lie angle setter plate moves independently of all the other subassemblies in the present disclosure via a fastener 153, and is used to calculate the lie angle of a given club placed in the club channel 154. The club channel 154 is attached to the club lie angle setter plate 152 so that it is parallel to the sides of the club lie angle setter plate 152, and is perpendicular to the top and bottom of the club lie angle setter plate 152. The club channel 154 holds a club in a slot of the channel; therefore making the club shaft also parallel to the sides of the club lie angle setter plate 152, and perpendicular to the top and bottom of the club lie angle setter plate 152. The bottom edge extender channel 156 is loosely attached to the club lie angle setter plate 152 and also just like the club channel 154, it is attached to it so that it is parallel to the sides of the club lie angle setter plate 152, and is perpendicular to the top and bottom of the club lie angle setter plate 152. It freely slides up and down all the while its bottom edge staying parallel to the bottom edge of the club lie angle setter plate 152. It simply allows the operator to extend the bottom edge of the subassembly 150 down, more specifically, the bottom edge of the club lie angle setter plate 152. The bottom edge extender channel 156 will rest on the arm for the dual channel propeller 181 and will freely move up or down as the arm for the dual channel propeller 181 is adjusted to represent the club's lie angle. The purpose of bottom edge extender channel 156 is to extend the bottom edge of the club lie angle setter plate 152 so one can know when the bottom edge of the club lie angle setter plate 152 and the arm for the dual channel propeller 181 are exactly parallel.

The operator places the desired club the club channel 154 (shown in FIG. 4) and squares it up, just like the club face would be at address, parallel to the ground. This is accomplished by attaching a bubble level (not shown) to the face of the club, parallel to one of the grooves on the face of that club. The club lie angle setter subassembly 150 is then pivoted around fastener 153 until the bubble level reads that it is level and when that occurs the club will then be square, just like it would be square on the ground at address; hence revealing its true lie angle. Once the club is levelled, the operator can tighten the fastener 153 such that the angle of the plate 152 is fixed. Finally the subassembly can optionally include one long sleeved bolt or similar smooth post surface for resistance bands to have a smooth surface to wrap around as explain further below.

Figure 5:
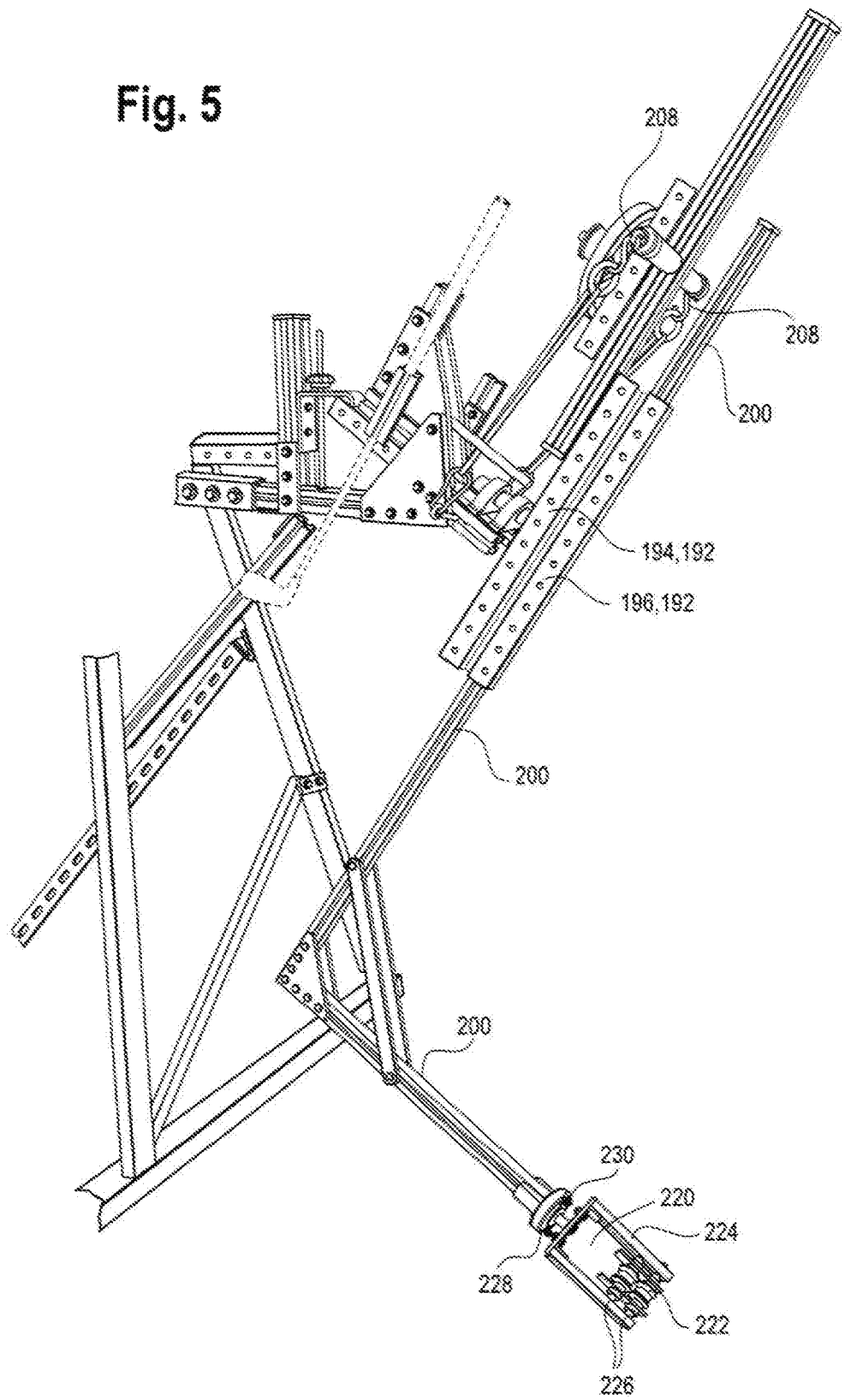
FIG. 5 shows a second perspective view of an assembly (including the propeller L and club grabber subassemblies) accordance with one example embodiment of the present disclosure.

Next, as shown FIGS. 3-5, the present disclosure includes propeller channel assembly 180. The propeller channel assembly 180 is comprised of an arm for the dual channel propeller 181, two propeller arm plates 140, 142 (FIG. 4), which hold the arm for the dual channel propeller 181, and the two pillow blocks 188, 190 which are fastened to the arm for dual channel propeller 181 and permit dual channel propeller 192 to spin and rotate like a propeller. Each pillow block 188, 190 is a housed bearing, and each accepts a bolt which is then bolted to the dual channel propeller 192. This propeller channel assembly 180 also includes, counter balance channel 197, weight plate channel 198, propeller "L" 200 and golf club grabber assembly 220, all described in greater detail below. This subassembly also includes vertical adjusting channel bracket 186. This vertical adjusting channel bracket 186 is manipulated up or down in order to move the arm for the dual channel propeller 181, which supports the entire propeller channel assembly 180, in order to set it to the given club's lie angle. The arm for the dual channel propeller 181 connects to the dual channel propeller 192 in a perpendicular fashion via a long bolt that goes through the dual channel propeller 192 and into the Pillow Block Bearings 188, 190.

The dual channel propeller 192 consists of two channels 194, 196. The first channel 194 is used to house the bolt that attaches the dual channel propeller 192 to the two pillow blocks 188, 190. The first channel 194 is also used to attach a counter balance channel 197 and a weight plate channel 198 to it. The second channel 196 is used to telescope the propeller "L" 200, which ends in the golf club grabber subassembly for guiding the club through practice swings.

Note that the preferred embodiment of the present disclosure involved determining a given golf club's lie angle, though a determination of the numeric value of that angle is not required in this embodiment. The club's lie angle simply needs to be revealed in order to set the propeller equal to it. That is accomplished by moving the arm for the dual channel propeller 181 such that it is parallel to the bottom edge of the club lie angle setter plate 152. That is achieved when the bottom edge extender channel 156 is flush with the arm for the dual channel propeller 181. This can be accomplished by loosening up the two bolts on the propeller arm plates 140, 142 so the arm for the dual channel propeller 181 is no longer tightly sandwiched and can move up or down as needed. The arm for the dual channel propeller 181 is then moved through turning an adjusting knob 202 in order to move the adjusting "L" bracket for propeller arm 204. The adjusting "L" bracket for propeller arm 204 moves because it is freely connected to and slides in the vertical adjusting channel bracket 186 and when it moves, it simultaneously moves the arm for the dual channel propeller 181. This is made possible because the adjusting "L" bracket for propeller arm 204 on the vertical adjusting channel bracket 186 is always engaged to the arm for the dual channel propeller 181. That is, when the arm for the dual channel propeller 181 moves down it increases the lie angle and steepens the swing plane. The extreme example club for such a swing plane (i.e., close to pure vertical) would be the putter. When the arm for the dual channel propeller 181 moves up it decreases the lie angle and flattens the swing plane. The extreme example club of such an angle would be the driver.

Shown in FIG. 4-5, The Propeller "L" 200 is slid through the second channel 196 of the dual channel propeller 192 and the weight plate channel 198 is attached to counter balance channel 197 which is attached to the first channel 194. Since the propeller "L" slides through the second channel 196 it is then parallel to the second channel 196 and because the short end of the propeller "L" 200 is attached at 90 degrees to the long end of propeller 200 then the short end of the propeller "L" 200 along with golf club grabber assembly 220 are parallel to the arm for the dual channel propeller 181 because that is attached at 90 degrees to the dual channel propeller 192. The weight plate channel 198 is made up of a perforated square channel with a threaded bolt coming out the center that will accept weight plates tor weight training the golf muscles. The weight plate channel 198 may be connected to the first channel 194 via a counter balance channel 197. Also attached to the counter balance channel 197 are bolts 208 for resistance tubing that is used for a smooth transition from backswing to downswing and a breaking system at the end of the follow through. The resistance tubing is also for mechanically powering the backswing or the downswing and follow through if one wishes. People of skill in the art will understand how this structure can be used as a failsafe for golfers having smaller stature (e.g., children) to limit the continued rotation of propeller channel assembly 180.

Next, as shown in FIGS. 5-6 is the golf club grabber assembly 220 attached to the short end of the propeller "L" 200. The golf club grabber assembly 220 preferably permits a golfer three types of movement of the club within the swing plane: a) rotational; b) hinged movement; and c) extension. The preferred structure for permitting such movement within golf club grabber subassembly 220 includes wheels 222 which permit the club to slide through which permits, among other things, the ability to extend the club during a backswing such that a club can actually move in an elliptical arc, and not a circular arc. The golf club may further use a rubber stopper (not shown) or the like above the hosel of the golf club to limit the extension of the shaft through the wheels 222. The wheels are further spring biased so as to define spring biased grooves to receive a golf club shaft while permitting a rotatable and extendable engagement with the golf club. The subassembly further includes a grabber frame 224 having pins 226 for supporting the spring biased grooves, and a wheel bearing 228 including a pin 230 for rotatably connecting to the grabber frame 224 for permitting the hinged engagement with the golf club; the wheel bearing 228 further being mounted upon the propeller "L" 200 to track the movement of the specific golf club during a swing.

A summary of how the preferred embodiment of this disclosure will take any golf club and set the swing plane for that club equal to that club's designed lie angle is as follows: 1) the desired club is placed in the club channel 154; 2) the club lie angle setter subassembly 150 is then pivoted around fastener 153 until the club is square, i.e. a level reading on a bubble level, hence, revealing its true lie angle; 3) the club lie angle setter subassembly 150 is then secured from pivoting; 4) the bolts on propeller arm plates 140, 142 are loosened so the arm for the dual channel propeller 181 can be adjusted; 5) the adjusting knob 202 is turned in order to move the adjusting "L" bracket for propeller arm 204 which slides in the vertical adjusting channel bracket 186. When the adjusting "L" bracket for propeller arm 204 moves, the arm for the dual channel propeller 181 moves, and when the arm for the dual channel propeller 181 moves, so does bottom edge extender channel 156. Thus, the adjusting knob 202 is turned appropriately so the bottom edge extender channel 156 becomes flush with the arm for the dual channel propeller 181. When the bottom edge extender channel 156 becomes flush with the arm for the dual channel propeller 181, then step 6) involves tightening the two bolts on propeller arm plates 140, 142 are then tightened, and result in the dual channel propeller 192 (first channel 194 & second channel 196) and the long end of propeller "L" 200 being parallel to the club shaft of the desired squared up club in club channel 154, i.e., they are angled exactly to represents the club's lie angle; additionally the arm for the dual channel propeller 181 is parallel to the short end of the propeller "L" 200 and golf club grabber subassembly 220. The next step 7) involves taking the club out of the club channel 154 and sliding it through the golf club grabber wheels 222 on the golf club grabber subassembly 220 (note, the golf club grabber subassembly 220 accepts the golf club at 90 degrees to the club's shaft and because of this the club shaft is parallel to the long end of propeller "L" 200 and parallel to the dual channel propeller 192 (first channel 194 & second channel 196)). Next, the process step 8) involves raising or lowering the "T" channel subassembly on the center post 120 to set the desired center of rotation for the propeller channel assembly 180; and lastly, 9) the propeller "L" 200 is lowered within the second channel 196 so that club head rest just above the ground. Thus, the user is now directed to swing the golf club on a swing path that has a swing plane equal to the club's lie angle still while permitting extension, rotation, and/or hinging movement of the club during the swing.

Those of skill in the art will appreciate that the weight plate channel 198 to incorporate variable weights or resistance as desired so that the exact muscles that are used to swing a golf club are pinpointed and focused on. The resistance tubing as discussed above may likewise be used to further hone the swing mechanism, e.g., for absorbing and help stopping the swing at the top of the backswing and at the end of the follow through. It also can be used to power or force an involuntary backswing or downswing/follow through. Such an optional feature would act like a training wheel to assist a golfer in learning parts of the swing one part at a time. Because this weight plate channel 198 can slide up and down on the counter balance channel 197, one can choose to exactly counter balance the entire propeller channel subassembly 180 by sliding the weight plate channel 198 until it is perfectly balanced, one can also choose to move the weight plate channel 198 down near its end near the pillow blocks 188, 190 and create more resistance for the back swing, one can also choose to move the weight plate channel 198 up and away from the pillow blocks 188, 190 and create an easier back swing and more resistance for the down swing. The resistance bands can likewise be adjusted to compel the entire propeller channel subassembly 180 to rotate back resembling the back swing without any force or help from that person, alternatively, to perform the down swing and follow through as if it was powered by a motor. Because of this feature, beginners can learn immediately the proper swing techniques with little effort.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, alternative versions of the present disclosure could have a physically separate lie angle plate and/or use numeric values for the calculation of the corresponding propeller arm angle. A further alternative which could be used with the present invention are alternative grabbing mechanisms sized to attach to different club structures (e.g., baseball bats or lacrosse sticks) for similar teaching methods. Likewise, it will be appreciated by those skilled in the art that various changes, additions, omissions, and modifications can be made to the illustrated embodiments without departing from the spirit of the present disclosure. All such modifications and changes are intended to be covered by the following claims,

We claim:

1. An adjustable propeller channel assembly to assist a golfer to improve his/her golf swing, the assembly comprising:
    a) a moveable club grabber for engaging at least a shaft of a specific golf club including a specific golf club head;
    b) a plurality of propeller channel pieces enabling a user actuated swing with a specific swing plane;
    c) a propeller Channel for slidably engaging at least one of the plurality of propeller channel pieces so as to set and maintain consistent height placement of the specific golf club head; and
    d) a wheel bearing for rotatably connecting the movable club grabber with at least one of the plurality of propeller channel pieces.

2. The adjustable propeller channel assembly of claim 1, wherein the plurality of propeller channel pieces includes an L shaped propeller, wherein the plurality of propeller channel pieces can be adjusted to alter the slope of the swing plane that the specific golf club can traverse when engaged with the moveable club grabber.

3. The adjustable propeller channel assembly of claim 2, wherein the plurality of propeller channel pieces can be adjusted to alter the intersection of the swing plane that the specific golf club can traverse when engaged with the moveable club grabber with the user operating the specific golf club.

4. The adjustable propeller channel assembly of claim 1, wherein the plurality of propeller channel pieces includes an L shaped propeller, wherein the plurality of propeller channel pieces can be adjusted to alter radius of the are that the specific golf club can traverse when engaged with the moveable club grabber.

5. A golf club grabber assembly for connection to a mechanical arm, the golf club grabber assembly teaching an improved golf swing generated by a user for a specific golf club with a shaft having a club face striking surface comprising of a frame holding at least a pair of spring-biased wheels for receiving the club shaft, where the spring-biased wheels a user to propel the rotation of the club engaging the golf club grabber assembly, wherein the at least a pair of spring-biased wheels define a groove to receive a golf club shaft while permitting a user an extendable engagement with the golf club.

6. An adjustable propeller channel assembly to assist a golfer having a given height to improve his/her golf swing, the assembly comprising:
    a) a moveable club grabber for engaging at least a shaft of a specific golf club;
    b) a plurality of propeller channel pieces enabling a user actuated swing with a specific swing plane;
    c) a propeller Channel for slidably engaging at least one of the plurality of propeller channel pieces so as to set and maintain consistent height placement of the specific golf club head including a specific golf club head;
    d) at least one adjustable frame component for connecting to and supporting the at least one propeller channel piece to compensate for the given height of the golfer and or the center of rotation height placement; and
    e) a wheel bearing for rotatably connecting the movable club grabber with at least one of the plurality of propeller channel pieces.

7. The adjustable propeller channel assembly of claim 6, wherein the plurality of propeller channel pieces includes an L shaped propeller, wherein the plurality of propeller channel pieces can be adjusted to alter the slope of the swing plane that the specific golf club can traverse when engaged with the moveable club grabber.

8. The adjustable propeller channel assembly of claim 7, wherein the plurality of propeller channel pieces can be adjusted to alter the swing plane that the specific golf club can traverse when engaged with the moveable club grabber with the user operating the specific golf club.

9. The adjustable propeller channel assembly of claim 6, wherein the plurality of propeller channel pieces includes an L shaped propeller, wherein the plurality of propeller channel pieces can be adjusted to alter radius of the arc that the specific golf club can traverse when engaged with the moveable club grabber.

* * * * *

UNITED STATES PATENT AND TRADEMARK OFFICE
CERTIFICATE OF CORRECTION

PATENT NO. : 11,331,555 B2
APPLICATION NO. : 16/854545
DATED : May 17, 2022
INVENTOR(S) : Roelle et al.

It is certified that error appears in the above-identified patent and that said Letters Patent is hereby corrected as shown below:

In the Specification
Column 1, Line 5: "10,625,113" should read --10,625,133--
Column 1, Line 32: "golf hall" should read --golf ball--
Column 4, Line 15: "swine plane" should read --swing plane--
Column 4, Line 54: "accordance" should read --in accordance--
Column 4, Line 57: "with example" should read --with one example--
Column 4, Line 63: "what currently" should read --what is currently--
Column 5, Line 20: "shilling" should read --shifting--
Column 7, Line 31: "plates tor" should read --plates for--

In the Claims
Claim 4, Column 10, Line 2: "of the are" should read --of the arc--
Claim 5, Column 10, Line 12: "wheels a user" should read --wheels permit a user--

Signed and Sealed this
Ninth Day of August, 2022

*Katherine Kelly Vidal*
Katherine Kelly Vidal
*Director of the United States Patent and Trademark Office*